Aug. 15, 1967  J. P. GALLAGHER  3,335,493
LINE CUTTER
Filed Sept. 27, 1965
2 Sheets-Sheet 1
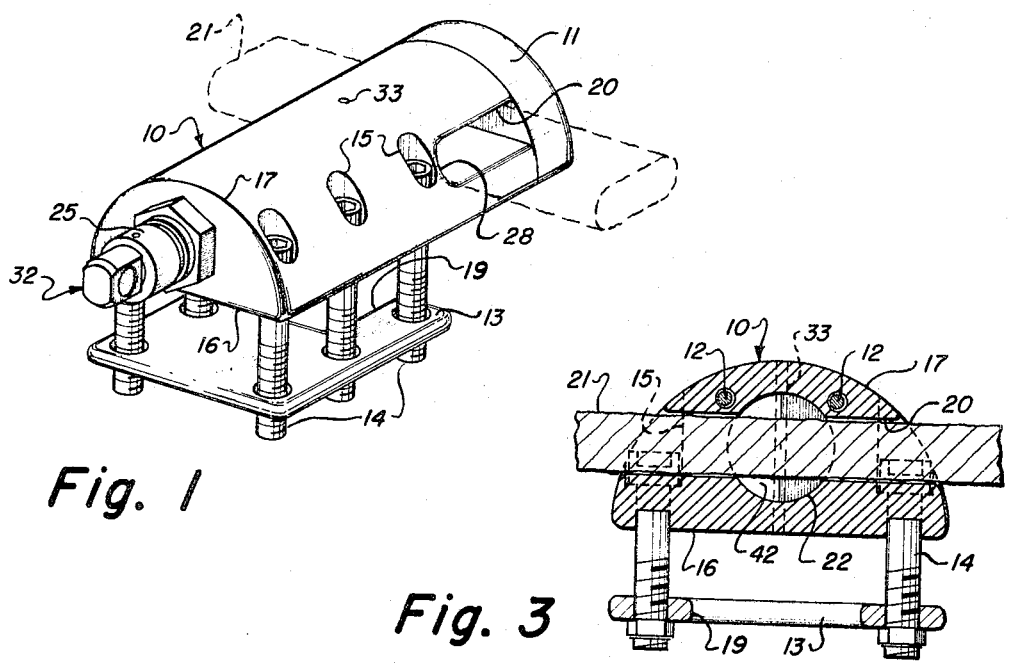
Fig. 1
Fig. 3
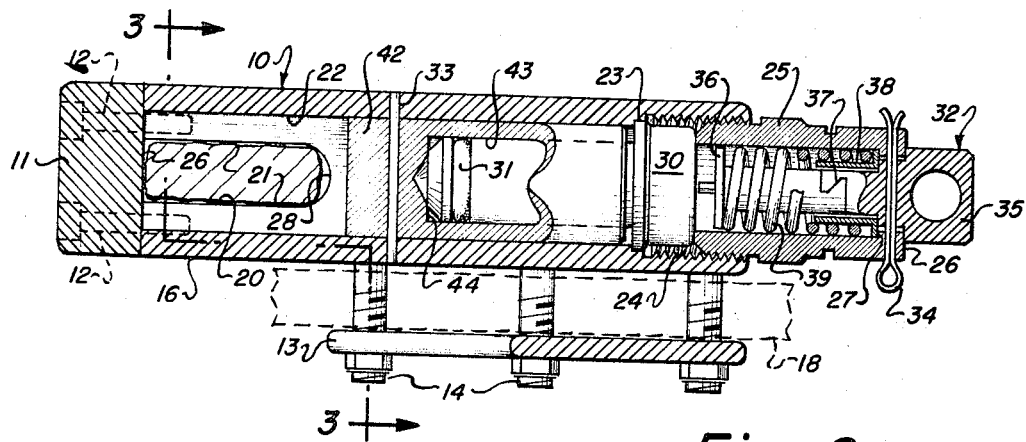
Fig. 2
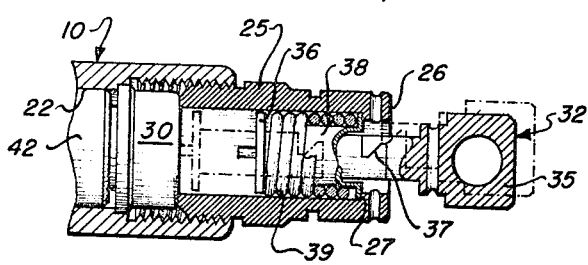
Fig. 4
INVENTOR.
James P. Gallagher
BY
*Attorney*

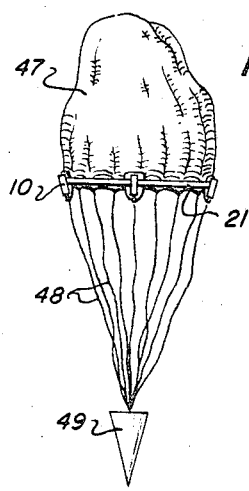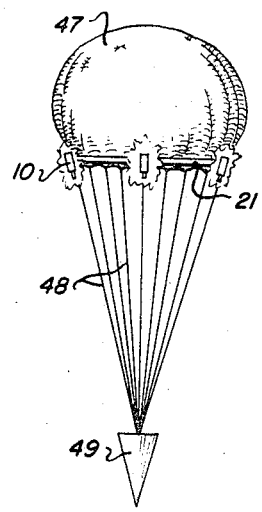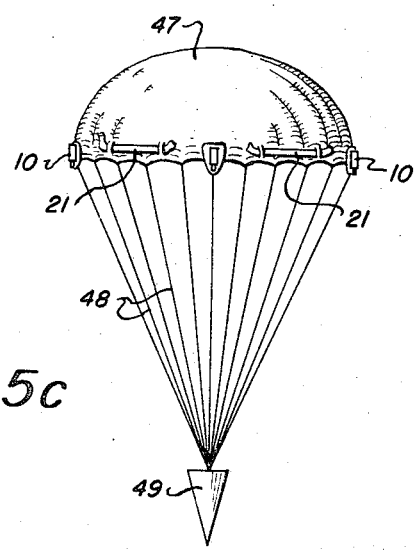

United States Patent Office 3,335,493
Patented Aug. 15, 1967

3,335,493
LINE CUTTER
James P. Gallagher, Albuquerque, N. Mex., assignor, by mesne assignments, to the United States of America as represented by the United States Atomic Energy Commission
Filed Sept. 27, 1965, Ser. No. 490,752
4 Claims. (Cl. 30—180)

ABSTRACT OF THE DISCLOSURE

A parachute reefing line severing device for use at high altitudes and speeds has a body with smoothly arcuate outer surface merging into planar clamping surface and a clamping plate parallel to the clamping surface cooperates to grip a parachute portion therebetween; a reefing line channel adjacent one end of and generally parallel to the clamping surface is closed at one end by an end plate and a knife contained in a passageway moves therethrough to sever a reefing line in the channel.

---

This invention relates to a line cutter and more particularly to a re-useable, highly compact, and reliable reefing line cutter.

There is need for a device to sever the reefing lines of parachutes deployed at high altitudes or at high speeds. Typically a parachute of the nature described herein is subject to an initial opening shock of about 5000 pounds per square foot for about one second. Such parachutes are only partially deployed initially in order to prevent rupture and destruction of the parachute which results from full deployment at high altitude or high speed. Full deployment is prevented by placing a reefing line around the parachute skirt. Upon reaching predetermined conditions, expressed in terms of time, G forces, velocity, or a combination of factors, the reefing line is cut, allowing full deployment of the parachute and the consequent safe let-down of the store or load attached thereto.

A smooth, compact exterior configuration, devoid of sharp corners, is desirable. Such a configuration prevents damage to the parachute material during packing, while packed, and upon deployment. Also incorporated in the configuration characteristics should be provisions for structurally enabling the device to be used more than once. This would mean, of course, that the body of the device must be able to withstand and absorb the enrergy liberated in the firing or actuating of the device and in the decelerating and stopping of the knife or line cutting means. Inherent in structural strength characteristics must also be the ability to remain secured to the parachute regardless of large G forces, which may reach 15 to 20 G's, and other imposed strains.

Reliability is another desired characteristic. The cutter must actuate at the desired time as a result of predetermined conditions, as for example, the pulling of a firing pin rather than a sudden shock or high G forces. These large magnitude dynamic forces have caused prior art devices to activate and thus to malfunction. The parachutes involved may be packed under pressures of about 40–45 p.s.i. in order to reduce the volume to a minimum. The reefing line cutters are therefore subject to unbalanced forces, twisting moments, etc., which are inherent in attempting to pack and compress a device such as a parachute. A cutter should be able to withstand such forces and be able to actuate upon command. Also inherent in the described packing would be a twisting of the reefing line. Since the line should not be rigidly clamped to the cutter, but should be allowed to move relatively freely to compensate for movements of the parachute in packing and deployment, reliability parameters would seem to require provisions for eliminating or greatly reducing the twisting of the line at or near the point of severance to obviate the possibility of a malfunction.

While the reefing line should be able to move freely, the cutter itself should be securely fastened at a specific location at or near the parachute skirt in such a manner that high dynamic forces will not dislodge the device, and yet the device should be secured in such a manner that the danger to the parachute from burns, cuts, tears, or other harm is minimized.

In addition to the structural strength and other requirements discussed above, the reefing line cutter assembly should be lightweight and compact. Size and weight are perennial problems with all airborne equipment, and especially with parachutes or other fall retardation devices. It is therefore highly desirable to perfect a cutter which is lightweight and compact, and yet one which is able to satisfy the other criteria and desiderata discussed above.

Of the devices presently available, none has been found satisfactory in the above mentioned characteristics.

It is therefore an object of the present invention to provide a compact reefing line cutter with a smooth external configuration.

Another object is to provide a re-useable reefing line cutter.

Another object is to provide a reefing line cutter which is able to withstand pressure packing and extreme loads.

Another object is to provide a reefing line cutter which contains a stable anvil for the knife to strike after cutting the line.

Another object is to provide a highly reliable reefing line cutter.

This specification, including the description, claims, and drawing, have been prepared in accordance with the applicable patent laws and the rules promulgated under the authority thereof.

FIG. 1 is a perspective view of the present invention;

FIG. 2 is a longitudinal cross-section of the present invention;

FIG. 3 is a view taken substantially along line 3—3 of FIG. 2;

FIG. 4 is a sectional view showing operation of the firing mechanism of the present invention; and FIGS. 5a, 5b, and 5c show the invention in its use environment.

The present invention may comprise a body portion 10 having an end cap 11 secured thereto by capscrews 12 and a clamping plate 13 secured to the body portion by fastening means 14. The body, end cap, and clamping plate may be of aluminum or some other strong, lightweight material. The body 10 preferably may have a smoothly arcuate surface configuration 17, devoid of sharp edges or corners, and may have apertures 15 counterbored for substantially completely receiving the bolts or other fastening means 14. The assembly may be secured to a parachute 47 (see FIG. 5a) by clamping a supporting web between the planar surface 16 and the plate 13. The arcuate body portion, merging into the planar clamping surface, without sharp edges or corners, present a rugged, compact construction which is able to withstand the forces of pressure packing and heavy G forces exerted as the parachute is deployed, and prevents any snagging, tearing, or entanglement. The arcuate body also allows the fastening means 14 to be completely recessed so as to avoid snagging, tearing, or burning of the parachute, and yet still provide sufficient material for giving adequate structural strength to the device in terms of both the fastening of the device to the parachute and the preventing of any splitting or rupturing of the device upon actuation. For the optimum configuration, the arcuate section should preferably be not more than semi-circular in extent, and may be less.

To minimize the possibility of cutting, tearing, or burning the supporting web 18 (shown in phantom in FIG. 2) by asymmetrical forces or loads imposed by the fastening means 14 or by other forces such as the pressure packing or the dynamic forces of deployment, the clamping plate 13 may be relieved as at 19 for about 20% of its axial length and about 50% of its width longitudinally from the leading portion of the plate. The relieved portion may be of a square configuration symmetrical with respect to the longitudinal axis. The width of the supporting web should determine the actual width of the cutout portion. To further minimize the possibility of damage all edges and corners of the plate may be smoothly rounded.

A channel 20, extending across the body 10 in a chordlike manner, receives the reefing line 21. The channel, in passing through the housing in the manner shown, gives a stabilizing effect to the reefing line by preventing the line from twisting at or near the severance point. Typically, the reefing line 21 may be made of nylon on the order of 1" wide x ¼" thick, and may have a tensile strength of about 9000 pounds test. The channel, which may be slightly larger in order to prevent any binding and to insure that the line is free at all times should be smoothly arcuate, and devoid of sharp edges at the planes of intersection with the body. The inwardly disposed end 28 of the channel 20 may be adjacent the termination of the leading portion of the clamping plate 13. A circular passageway 22, counterbored as at 23, and tapped as at 24 for receiving the threaded portion of the actuator housing 25, may extend axially through the body and communicate with the channel 20. Disposed in the passageway is the cutter or knife 42, which may also be aluminum, the explosive charge 30, a portion of which extends inside the knife in a bore 43, and sear pin assembly 32 which is received inside the actuator housing 25. A shear pin 33 may extend radially through the body or housing 10 and knife 42. The shear pin 33, which may be Nichrome, is preferably in a double shear relationship with the knife by extending continuously through the body and knife and may be in a continuous interference fit with them. For example, the pin may be on the order of .020" diameter while the diameter of the receiving radial aperture, through both the housing 10 and the knife 42, may be about .018". In addition to preventing movement of the knife due to inertia, dynamic shocks, etc., the pin prevents the knife from angularly rotating about its longitudinal axis. This insures that the knife will fire in the "erect" position with the plane of the blade perpendicular to the plane of the line 21. If the knife fired in a skew position, the possibility of a malfunction would be great. A safety pin 34 may extend through the sear 32 and the actuator housing 25. The removal of the safety pin 34 when the device is packed with the parachute arms the cutter.

The sear pin assembly 32 comprises a head portion 35, which may abut the exterior flange 26 of the actuator housing 25, and a firing pin portion 36 releasably secured together at cam faces 37. A sleeve 38 surrounds a portion of the sear pin and abuts the interior flange 27 of the actuator housing 25. An outwardly disposed radial flange on the sleeve preferably forms one thrust wall for a compression spring 39 and an outwardly disposed radial flange on the firing pin portion forms the other thrust wall for the spring. An outwardly extending axial force of about 20 pounds on the head portion 35 causes the firing pin portion 36 to move relative to the explosive charge 30 and compress spring 39 as shown in FIG. 4. When the cam faces 37 are free of the bore of the sleeve 38 and exterior flange 26 the two portions may separate as shown in phantom in FIG. 4, and the energy of the compression spring may drive the firing pin against the explosive charge. The force of the explosive charge is directed against the forward wall 44 of the bore 43. An O-ring 31 contains the explosive gases in the bore 43, preventing corrosion or damage to the assembly and the parachute.

The knife, after cutting the line, is stopped by the anvil surface 26 of the end plate 11, which also supports the line during the cutting operation. The flat anvil provides a stable surface which insures that the line will be cut cleanly and that the knife will be stopped promptly.

FIGS. 5a, 5b, and 5c illustrate how the present invention may be employed. A plurality of reefing line cutters 10 may be secured to a parachute device 47 as previously described with the reefing line 21 extending through the channel means 20 and serving to confine or reef the skirt of the parachute as it is first deployed. The parachute may typically be of the ribbon type with a canopy diameter of about 20 feet. The sear pin assembly 32 may be secured to shroud lines 48. As the parachute is initially deployed, the reefing line prevents the skirt from billowing and sustaining initial shock damage from high G forces. Under the weight of the store 49 acting in one direction and the retardation forces of the partially deployed parachute acting in the opposite direction, the shroud lines extend from the slack position of FIG. 5(a) to the taut position of FIG. 5(b), which in turn causes the head portion 35 of the sear pin assembly to be withdrawn from the actuator housing 25. As the head is withdrawn the spring 39 compresses and the energy stored in the spring is released when the cam faces 37 separate as the shroud lines continue to extract the sear pin head portion 35. The energy of the spring 39 propels the firing pin portion 36 against the explosive charge 30. As is well known in the art, the explosive charge 30 may comprise an instantaneous fuse or a time delay fuse depending on the specific repuirements involved. When the explosive charge 30 fires the knife 42 is propelled forward in passageway 22 by the explosive gases contained in the bore 43 of the knife 42. The propulsive force of the knife shears pin 33 and cuts reefing line 21 which is stabilized by the anvil head of end cap 11 allowing the full deployment of parachute device 47, as shown in FIG. 5(c). The end cap 11 may serve as terminal deceleration means for the knife which preferably moves through a distance less than the length of the interior bore 43, thus confining in the bore the corrosive gases resulting from the firing of the explosive charge 30.

It is readily apparent that due to the simple, rugged construction of the cutter, only the shear pin and charge need to be replaced in order to re-use the device.

Thus it is seen that the reefing line cutter as described above solves the problems heretofore present in such cutters, by providing a compact, smoothly contoured, rugged, re-useable device which is able to withstand pressure packing and extreme G force loads, and, by providing a stable anvil, is able to effectively and efficiently sever the line and contain the knife and the explosive gases.

I claim:

1. A device for severing a parachute reefing line comprising the combination of a body portion having a smoothly arcuate outer surface with oppositely disposed edges merging into a generally planar clamping surface and having at one end thereof a channel therethrough generally parallel to said clamping surface for containing a portion of a parachute reefing line, a removable end plate secured to said body portion and closing one end of said channel, a passageway extending longitudinally through said body and communicating with said channel, a knife and actuating means carried by said passageway for severing when actuated a line disposed in said channel, a clamping plate generally parallel to said clamping surface for clamping therebetween a supporting portion of a parachute, and means for urging said body portion and clamping plate toward each other to retain said supporting portion therebetween.

2. A device claimed in claim 1, wherein said means comprises a plurality of spaced apart bolts and said body portion is provided with recesses to substantially completely house head portions of the bolts when in operative retaining relationship.

3. A device as claimed in claim 1, wherein said clamping plate has one end portion terminating adjacent an inwardly disposed end of said channel.

4. A device as claimed in claim 3 wherein said clamping plate is relieved in an axial direction for approximately 20% of its length and approximately 50% of its width longitudinally from the portion adjacent an inwardly disposed end of said channel to prevent the said supporting portion from being torn or burned during packing or upon deployment.

References Cited
UNITED STATES PATENTS

| | | | |
|---|---|---|---|
| 2,755,550 | 7/1956 | Benjamin | 30—180 |
| 3,003,235 | 10/1961 | Temple et al. | 30—180 |
| 3,036,798 | 5/1962 | Martin | 244—141 |

WILLIAM FELDMAN, *Primary Examiner.*

J. C. PETERS, *Examiner.*